(12) United States Patent
Wang et al.

(10) Patent No.: US 8,737,574 B2
(45) Date of Patent: May 27, 2014

(54) SELF-SERVICE CIRCUIT TESTING SYSTEMS AND METHODS

(75) Inventors: Yiming Wang, Bedford, MA (US); Lauren B. Adelson, New York, NY (US); David J. Buie, Washington, DC (US); Colleen Davis, Phoenix, AZ (US); Peter C. Serubo, Laurel Springs, NJ (US); Roland J. Zito-Wolf, Watertown, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 25 days.

(21) Appl. No.: 13/332,913

(22) Filed: Dec. 21, 2011

(65) Prior Publication Data

US 2012/0123727 A1 May 17, 2012

Related U.S. Application Data

(63) Continuation of application No. 11/616,608, filed on Dec. 27, 2006, now Pat. No. 8,098,797.

(51) Int. Cl.
*H04M 1/24* (2006.01)
*H04M 3/08* (2006.01)
*H04M 3/22* (2006.01)

(52) U.S. Cl.
USPC .... 379/29.01; 379/12; 379/15.05; 379/22.01; 379/22.03; 379/27.04

(58) Field of Classification Search
USPC ........ 379/1.01, 9, 9.02, 9.04, 9.06, 14, 14.01, 379/10.01, 10.03, 12, 15.01, 22, 27.01, 379/27.04, 29.01, 29.02, 29.09, 29.1, 32.04, 379/15.05, 22.01, 22.03
See application file for complete search history.

(56) References Cited

U.S. PATENT DOCUMENTS

| | | | |
|---|---|---|---|
| 5,533,093 A * | 7/1996 | Horton et al. | 379/21 |
| 5,553,059 A | 9/1996 | Emerson et al. | |
| 5,784,558 A | 7/1998 | Emerson et al. | |
| 5,964,891 A | 10/1999 | Caswell et al. | |
| 6,360,268 B1 * | 3/2002 | Silva et al. | 709/227 |
| 6,834,099 B1 * | 12/2004 | Cowden et al. | 379/29.01 |
| 7,260,184 B1 * | 8/2007 | Howard et al. | 379/9 |
| 7,400,586 B2 * | 7/2008 | Izundu et al. | 370/241 |
| 2002/0073374 A1 | 6/2002 | Danialy et al. | |
| 2002/0141542 A1 | 10/2002 | Angliss et al. | |
| 2002/0141543 A1 | 10/2002 | Dunlap | |
| 2002/0145548 A1 | 10/2002 | Angliss et al. | |
| 2004/0165533 A1 | 8/2004 | Izundu et al. | |
| 2006/0221842 A1 | 10/2006 | Terry | |

* cited by examiner

*Primary Examiner* — Binh Tieu

(57) ABSTRACT

In one of many possible embodiments, an exemplary system includes a test management subsystem configured to provide a user portal to a user of a circuit provided by a service provider, the user portal including a tool enabling the user to select a signal loop for testing at least a section of the circuit, the signal loop being selected from a plurality of signal loop options. The system also includes a network management subsystem communicatively coupled to the test management subsystem, the network management subsystem being configured to receive data representative of the selection from the test management subsystem and instruct, based on the selection, a network device along the circuit to execute a loop-back mode. In certain embodiments, the selected signal loop defines a test pattern signal flow for testing a subsection of the circuit.

18 Claims, 6 Drawing Sheets

Test a Circuit

Service ID  68JDHZAJ153803JNE
State  MA
Test  Full Test Battery ▾ ← 310

Initiate Full Test Battery (Intrusive)

Acknowledgement  ☐ I understand that this is an intrusive
315 ↗                     request that interrupts service.

Run Time  ○ Immediate
              ○ Scheduled
320 ↙          •Test Date  ▾  ▾
               •Test Start ▾  ▾

Notification  ☒ Send e-mail when results are available
330 ↗              •E-mail Address [name@company.com]

Requested By  Name [      ]
335 ↗             Contact Method  ▾
                  Contact Number [   ]

[back]  [submit]

About the Test ← 340

Description  This intrusive test
runs all stress patterns required to
insure that the circuit is operating
in accordance with technical
service specifications... more ← 345

Duration  A minimum of 120
minutes

SELF-SERVICE CIRCUIT TESTING SYSTEMS AND METHODS

CROSS-REFERENCE TO RELATED APPLICATIONS

This present patent application is a continuation of U.S. patent application Ser. No. 11/616,608, filed Dec. 27, 2006, entitled "Self-Service Circuit Testing Systems and Methods" to Yiming Wang. The disclosure of this priority application is hereby incorporated by reference herein in its entirety.

BACKGROUND INFORMATION

For years, reliable communication services have been provided over circuit-switched networks such as the Public Switched Telephone Network ("PSTN"). More recently, packet-switched networks (e.g., the Internet) capable of carrying data and voice communications have been developed. Such networks allow Internet Protocol ("IP") enabled devices to send and receive IP-based voice communications between one another over packet-switched networks such as the Internet.

Problems such as service interruptions may sometimes be encountered by subscribers to communication services provided over communication networks. In the past, subscribers typically notified service providers of problems by phone or e-mail when possible. Service providers then executed tests and/or other procedures to troubleshoot the problems. In a telephone network, for example, a carrier could internally test circuits and equipment to identify the cause of a problem.

More recently, applications have been developed to offload internal troubleshooting workloads by providing limited test management capabilities to subscribers. A conventional test management application generally enables a subscriber to manage limited test operations in order to self-test network resources (e.g., circuits). For example, a subscriber to a service provided over a Public Switched Telephone Network ("PSTN") can use a conventional self-testing application to initiate a full circuit test.

However, conventional self-testing applications exhibit shortcomings. For example, traditional applications do not provide subscribers with tools for self-testing network resources beyond the circuit level. For instance, a subscriber experiencing a service interruption along a circuit may be able to initiate a test of the entire circuit using a conventional self-testing application, but the application does not allow the user to test specific subsections of the circuit. Accordingly, the subscriber is limited to discovering only very general test results for a circuit and is unable to pinpoint problems beyond the circuit level.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 3A illustrates another exemplary graphical user interface that may be provided by the self-service circuit testing system of FIG. 1.

DETAILED DESCRIPTION

Figure 1:
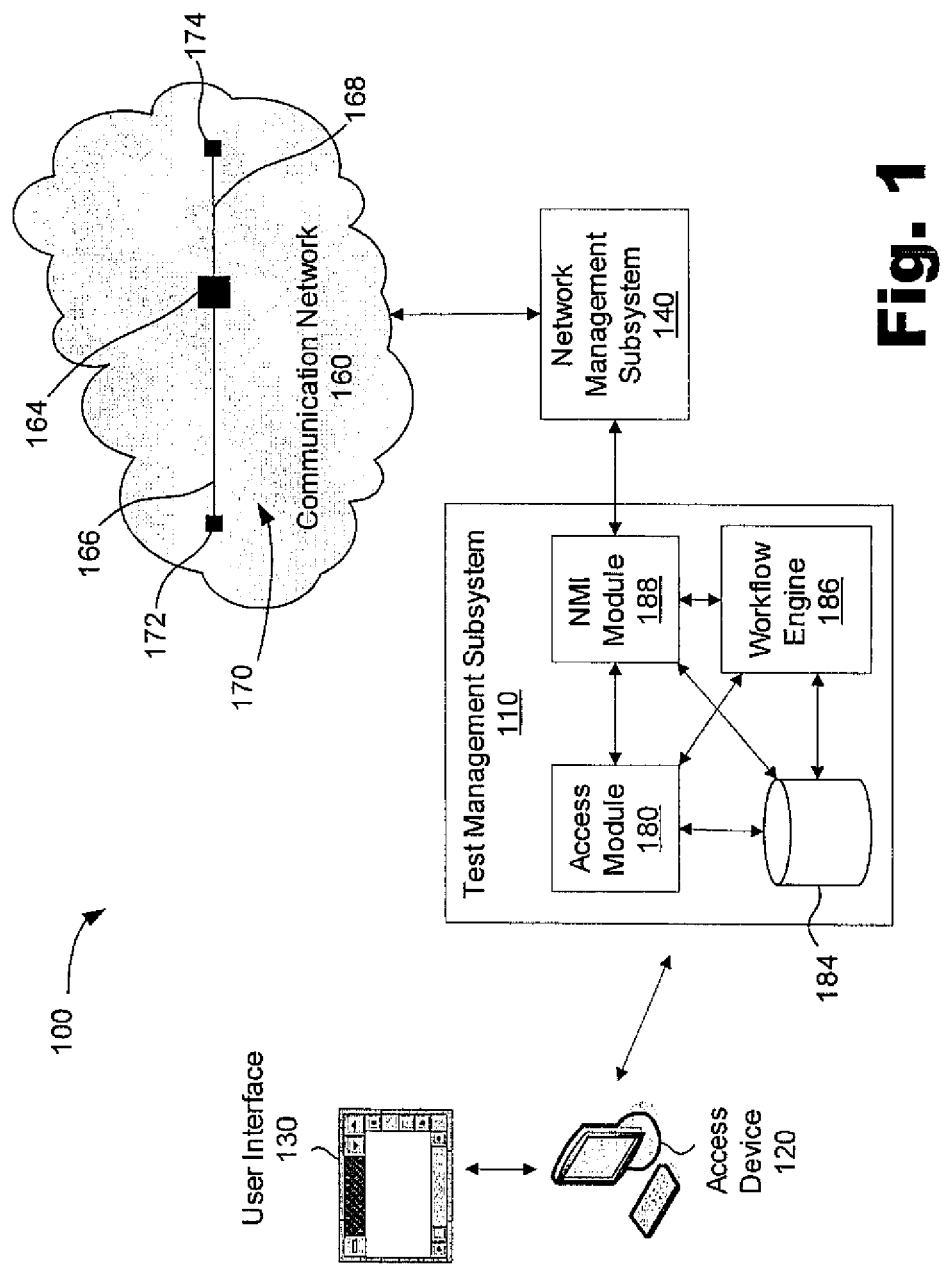
FIG. 1 is a block diagram illustrating an exemplary self-service circuit testing system.

Exemplary systems and methods for self-service circuit testing are described herein. In certain embodiments, a user portal is provided through which an external party is able to manage testing of resources maintained by an internal party, where the resources are used to provide services to the external party. The internal party may include a service provider such as a telecommunication service provider, and the external party may include a subscriber to services provided by the service provider. The resources may include communication network resources, including communication circuits and subsections thereof.

As used herein, the term "circuit" refers generally to a communication circuit or link (e.g., a telephone line) between two endpoint devices and transmission media producing the communication link. A circuit may include one or more circuit subsections (i.e., segments) linked together to form the circuit. For example, an exemplary circuit may include two endpoints and an intermediary point forming a circuit subsection between one of the endpoints and the intermediary point and another circuit subsection between the other endpoint and the intermediary point. Together, the circuit subsections may form a communication circuit generally capable of carrying communication signals between the two endpoints. Typically, endpoint devices (e.g., subscriber devices) are located at the endpoints and one or more network devices are located at the intermediary point. A circuit may include circuit-switched segments, packet-switched segments, or a combination thereof.

The user portal may provide a tool by which the external party is able to select and initiate a test of a circuit associated with the external party. In certain embodiments, the user portal also provides at least one tool with which the external party is able to select from a plurality of signal loops configured to test different sections of the circuit. This additional level of test selection detail may be provided at the request of the external party or when a full-circuit test identifies one or more problems along the circuit.

The signal loop options may enable the external party to select a specific subsection of a circuit to be tested. For example, the external party can remotely select a signal loop (i.e., by loop placement) over which test signals will be looped. By enabling the external party to select specific subsections of a circuit to be tested, an increased level of test management control is provided to the external party, and more internal party workload can be offloaded to the external party, as compared to conventional applications.

Moreover, the external party can conduct tests at an improved level of accuracy. Through the user portal, for example, a subscriber may initiate a test of a service provider circuit connecting a location in Boston, Mass. with a location in Los Angeles, Calif. If the test results for the full circuit indicate that there is a problem along the circuit, the user portal can provide additional tools and/or information that the external party may utilize to manage additional and more precise testing operations. For example, the user portal may provide a tool by which the external party can select and initiate a test of a subsection of the circuit, such as a circuit subsection connecting a location in Boston, Mass. to a location in Cleveland, Ohio.

In some embodiments, network status and/or test data may be obtained and provided to the external party, which may utilize the data to help with the testing and management of network resources. For example, if an external party initiated a test of a circuit and the test indicated the existence of a problem somewhere along the circuit, the results of other network tests could be used to provide helpful information to the external party. For instance, the user portal may provide testing recommendations to the external party, such as which subsection of a circuit is likely to include the problem identified in a full-circuit test. The recommendation may be based on other tests that have been performed on related network resources.

Components and functions of exemplary embodiments of self-service circuit testing systems and methods will now be described in detail.

FIG. 1 illustrates an example of a self-service circuit testing system 100 (or simply "the system 100"), according to an embodiment. As shown in FIG. 1, the system 100 may include a test management subsystem 110 communicatively coupled to an access device 120, which is configured to present a user interface 130 for consideration of a user of the access device 120. The test management subsystem 110 may provide an external party using or otherwise associated with the access device 120 with a user portal enabling remote access to test management tools and functions.

As shown, the test management subsystem 110 may be communicatively coupled to a network management subsystem 140, which may be configured to control network operations and obtain data related to the testing of resources included in a communication network 160. For example, the network management subsystem 140 may provide signaling to network devices in the communication network 160 and instruct the devices to perform or to stop performing test-related operations. The network management subsystem 140 may also collect data from the network devices and make the data accessible to the test management subsystem 110, which can provide at least a subset of the data to the external party via the access device 120.

By way of an example, the network management subsystem 140 may control operations or settings of a network device 164 (also referred to as the "intermediary device 164") so that tests of a circuit 170 connecting two endpoints 172 and 174 can be performed, and/or so that tests of subsection 166 and/or subsection 168 of the circuit 170 can be performed, as described below. In particular, the network device 164 may be placed in a loop-back mode to create a signal loop for testing subsection 166 or subsection 168 of the circuit 170, or the network device 164 may operate in a normal pass-through mode (non-loop-back mode) to establish a signal loop for testing of the entire circuit 170. As described herein, the test management subsystem 110 may provide an interface by which an external party can provide messages to and receive data from the network management subsystem 140, and thereby control operations of network resources for testing purposes.

In certain embodiments, the elements of the system 100 are implemented in multiple computing devices. The system 100 may include any computer hardware and/or instructions (e.g. software programs), or combinations of software and hardware, configured to perform the processes described herein. In particular, it should be understood that the system 100 may be implemented on more than one physical computing device. Accordingly, the system 100 may include any one of a number of well-known computing devices (e.g., one or more servers), and may employ any of a number of well-known computer operating systems, including, but by no means limited to, known versions and/or varieties of the Microsoft Windows® operating system, the Unix operating system, and the OS/390 operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1, the exemplary components illustrated in the Figure are not intended to be limiting. Indeed, other alternative hardware environments and implementations may be used. The components of the system 100 will now be described in additional detail.

The communication network 160 may include any suitable type or implementation of one or more networks configured to provide communication circuits between endpoint devices, such as devices located at endpoints 172 and 174 shown in FIG. 1. The communication network 160 may include one or more packet-switched networks (e.g., the Internet and/or a Voice over Internet Protocol ("VoIP") network), circuit-switched networks (e.g., a Public Switched Telephone Network ("PSTN")), or combination of circuit-switched and packet-switched networks (e.g., a hybrid VoIP and PSTN network). The communication network 160 may support one or more types of communications, including voice, data, and/or IP communications, for example.

Accordingly, a circuit of the communication network, such as circuit 170, may include circuit-switched, packet-switched, or a combination of circuit-switched and packet-switched communication segments and/or technologies. For example, circuit 170 may traverse a PSTN or a VoIP network, or part of the circuit 170 (e.g., subsection 166) may traverse a PSTN, and another part of the circuit 170 (e.g., subsection 168) may traverse a VoIP network such that communications between the endpoints 172 and 174 may be bridged between the PSTN and VoIP network.

The communication network 160 may include any device or devices potentially helpful for providing communication services to external parties. Such devices may include, but are not limited to, endpoint communication devices, subscriber devices, Public Branch Exchanges ("PBXs"), telephones, mobile phones, IP-enabled communication devices, personal digital assistants ("PDAs"), pagers, personal computers, laptop computers, intermediary network devices, central office devices, switching devices, gateways, Service Control Points ("SCPs"), Service Switching Points ("SSPs"), Signal Transfer Points ("STPs"), points of presence ("POPs"), routers, and other network nodes.

The devices included in the communication network 160 may be configured to support circuit testing functionalities, including, but not limited to, test transmission, reception, loop-back, and data collection functionalities. For example, certain devices (e.g., circuit endpoint devices) may be configured to transmit and/or receive test pattern signals over a circuit or circuit subsection. Certain devices (e.g., intermediary device 164) included in the communication network 160 may be configured to operate in a loop-back mode and loop back (e.g., reflect) test pattern signals. Accordingly, by way of an example, an endpoint device at endpoint 172 may transmit a test pattern signal over circuit subsection 166, intermediary device 164 may reflect the test pattern signal when operating in loop-back mode, and the endpoint device can receive the reflected signal. Other signal loops may also be used to test other segments of the circuit 170. In this or similar manner, testing operations may be executed by devices included in the communication network 160 in order to test network resources such as circuit 170 and/or circuit subsections 166 and 168.

The communication network 160 and devices included therein may be controlled by the network management subsystem 140. The network management subsystem 140 may provide instructions to and obtain data from network devices. Accordingly, the network management subsystem 140 can instruct one or more network devices to perform operations associated with testing of resources included in the communication network 160. The network management subsystem 140 will be described in more detail further below.

The communication network 160 is typically maintained by an internal party such as a carrier of telephone and/or other network communication services. The internal party may provide the physical and logical devices and transmission media capable of forming, testing, and tearing down communication links between devices (e.g., circuit 170 between endpoints 172 and 174).

Through the test management subsystem 110 and the network management subsystem 140, access device 120 may provide an external party with access to and/or control over certain functionalities and/or settings of the communication network 160, including functionalities and settings for testing network resources such as circuit 170 and/or subsection 166 or 168 of the circuit 170.

The access device 120 may be located remotely of the test management subsystem 110 and may include any device physically or remotely accessible to one or more users associated with an external party and that allows the user to provide input to and receive output from the test management subsystem 110. For example, the access device 120 can include, but is not limited to, one or more desktop computers, laptop computers, tablet computers, personal computers, personal data assistants, cellular telephones, satellite pagers, wireless Internet devices, embedded computers, video phones, network interface cards, mainframe computers, mini-computers, programmable logic devices, vehicles, routers, modems, home communication terminals, set-top boxes, and any other devices capable of communicating with the test management subsystem 110. The access device 120 can also include various peripherals such as a terminal, keyboard, mouse, screen, printer, stylus, input device, output device, or any other apparatus that can help a user interact with the access device 120.

The access device 120 may be communicatively coupled to the test management subsystem 110 using any suitable communication technologies. For example, communications between the access device 120 and the test management subsystem 110 may be carried out using any known communication technologies, devices, media, and protocols supportive of data communications, including, but not limited to, the Internet, intranets, local area networks, other communications networks, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), remote procedure calls, web service interfaces, socket connections, Ethernet, data bus technologies, and other suitable communications technologies. In certain embodiments, the access device 120 and the test management subsystem 110 are configured to communicate via the Internet or World Wide Web.

Communications between the access device 120 and the test management subsystem 110 may or may not utilize guaranteed message delivery technologies (e.g., message queue technologies). In certain examples, guaranteed messaging technologies may be utilized for communications between modules within the test management subsystem 110 and/or the access device 120. Communications between the access device 120 and the test management subsystem 110 may or may not be encrypted.

One or more users associated with an external party such as an enterprise subscriber may utilize the access device 120 to provide input to and receive output from the test management subsystem 110. Accordingly, the test management subsystem 110 may receive input from and present output to a user via the user interface 130. As described further below, the test management subsystem 110 may be configured to function as an interface between the access device 120 and the network management subsystem 140, thereby allowing the user and/or one or more applications running on the access device 120 to access and utilize functionalities of the network management subsystem 140 to control testing operations in the communication network 160.

While FIG. 1 shows a single access device 120, this is only illustrative. One or more access devices 120 associated with one or more external parties (e.g., subscribers) may communicate with the test management subsystem 110.

The access device 120 may include instructions for generating and operating the user interface 130. The instructions may be in any computer-readable format, including software, firmware, microcode, and the like. When executed by a processor (not shown) of the access device 120, the instructions may present the user interface 130 to a user of the access device 120.

The access device 120 may present the user interface 130 to a user as a way for the user to provide input to and/or receive output from the test management subsystem 110. The user interface 130 may comprise one or more graphical user interfaces ("GUI") capable of displaying information and receiving input from users. In certain exemplary embodiments, the user interface 130 includes a web browser, such as Internet Explorer® offered by Microsoft Corporation of Redmond, Wash.

However, the user interface 130 is not limited to a web form embodiment and may include many different types of user interfaces that enable users to utilize the access device 120 to communicate with the test management subsystem 110. In some embodiments, for example, the user interface 130 may include a voice interface capable of receiving input from and providing output to a user. Further, the user interface 130 may accept various types of input from users. Merely by way of example, the user interface 130 may include voice recognition applications.

The test management subsystem 110 may include any device or combination of devices and communication technologies useful for communicating with the access device 120, including providing a user portal to an external party associated with the access device 120. As shown in FIG. 1, the test management subsystem 110 may include an access module 180 configured to communicate with the access device 110. In certain embodiments, the access module 180 may include one or more than one server (e.g., web services and/or application servers) configured to generate and provide output to the access device 120, and to receive input from the access device 120.

The access module 180 may be configured to control access to test management subsystem 110 tools based on user entitlement, authentication, and/or permission levels. User entitlement may be based on subscriber and/or subscription data stored by or otherwise accessible to the test management subsystem 110. For example, the test management module may include a data store 184 storing user data having entitlement information, which may identify network resources and/or services to which a user is given access. Accordingly, a user is able to self-test (e.g., place signal loops) only the network resources to which he or she has testing entitlement and is prevented from interrupting network services and resources associated with other users.

The test management subsystem 110 is configured to provide a user portal that is remotely accessible by an entitled external party via the access device 120. The user portal may include one or more graphical user interfaces ("GUIs") such as web pages configured to provide information to and receive input from the external party. The test management subsystem 110 may provide the GUIs to the access device 120, which may present the GUIs in the user interface 130 for consideration by the external party.

Through interaction with the user portal, a user associated with an external party may manage operations and/or configuration of network resources included in the communication network 160. For example, the user may provide a test request and related data to the test management subsystem 110 via the access device 120. For instance, a user may provide a circuit identifier along with an instruction to conduct a test of the corresponding circuit. This information (i.e., test request data) may be received by the access module 180 in any suitable communication format and/or protocol, including a format (e.g., XML) or protocol (e.g., XML SOAP, HTTP, or TCP/IP) that may be used to communicate over the Internet or World Wide Web, for example.

The access module 180 may recognize the circuit identifier included in the test request data and use it to query the data store 184 for additional information related to the circuit identifier. The data store 184 may include information descriptive of the communication network 160. Such information may be obtained from the network management subsystem 140 in any suitable manner and may include, but is not limited to, circuit identifiers, circuit statuses, network device identifiers for network devices located along circuits, statuses and capabilities of the network devices, subscriber and/or subscription information associated with circuits, and past test results for circuits. If the circuit identifier included in the test request data is found in the data store 184, the access module 180 may access any stored information related to the circuit identifier, including any of the information Listed above that is related to the circuit identifier or corresponding circuit.

The access module 180 may provide the test request data and any related data retrieved from the data store 184 to a workflow engine 186 included in the test management subsystem 110. The workflow engine 186, which may include any known workflow applications and technologies, may be configured to generate workflow events and processes based on the test request data received from the access module 180 and related data included in the data store 184. For example, the workflow engine 186 may generate one or more workflow events designed to initiate, monitor, and end a test of the circuit associated with the circuit identifier included in the test request data. The workflow event may be generated in accordance with parameters provided by the user, including test schedule parameters, for example. Workflow events, processes, and data associated therewith may be stored in the data store 184 for future access and execution.

At an appropriate time, the workflow engine 186 may execute a workflow event or process to initiate one or more test operations. For example, the workflow engine 186 may generate one or more messages based on the test request data and related data stored in the data store 184 (e.g., information about the status of communication network 160). The messages may be provided to a network management interface ("NMI") module 188 included in the test management subsystem 110.

Communications between the elements of the test management subsystem 110 may be performed using any suitable communication technologies that can be used to create an interface between the access device 120 and the network management subsystem 140, including, but not limited to, XML formats and protocols, Ethernet, local area network technologies, IP-based protocols, web services protocols, etc.

The NMI module 188 may be configured to receive the messages from the workflow engine 186 and process the messages to generate messages that can be sent to and understood by the network management subsystem 140. The messages to the network management subsystem 140 may be in the form of any suitable communication technologies used in well-known network management systems. In certain embodiments, the NMI module 188 is configured to convert internal test management subsystem 110 communications to a format and/or protocol (e.g., Simple Network Management Protocol) that is employed by the network management subsystem 140. The NMI module 188 may also work in the reverse to parse and convert messages received from the network management subsystem 140 such that the contents of the messages can be understood by the test management subsystem 110.

The network management subsystem 140 may include any technologies for controlling or otherwise managing the communication network 160, including, but not limited to, any suitable and/or well-known management technologies such as Intelligent Control Plane ("ICP"), Element Management System ("EMS"), and Operation Support Network ("OSN"). The network management subsystem 140 may use any suitable communications technologies for communicating with network devices in the communication network 160 and/or the NMI module 188 of the test management subsystem 110. Examples of such technologies include, but are not limited to, one or more TMF-814 standards interfaces, Transaction Language 1 ("TL1") interfaces to the network devices, revised TMF-814 interfaces, Common Object Request Broker Architecture ("CORBA") interfaces, extensible mark-up language ("XML") interfaces, and Simple Network Management Protocol ("SNMP") interfaces. In certain embodiments, the network management subsystem 140, or components thereof, may be implemented on one or more of the network devices includes in the communication network 160.

To continue the circuit test request example described above, the network management subsystem 140 may receive one or more messages from the test management subsystem 110 related to the circuit test requested by the external party. The network management subsystem 140 can parse the message(s) and send commands to the appropriate network devices, the commands being configured to direct the network devices to execute specific operations to perform the requested test, or to at least configure the network devices in preparation of the requested test being performed. For a test of circuit 170, for example, the network management subsystem 140 may in certain examples instruct one endpoint device to transmit test pattern signals to the other endpoint device. The other endpoint device may or may not be directed to operate in a loop-back mode for the test. Accordingly, the circuit test may be a one-way or two-way test.

In addition to controlling operations and configurations of network devices, the network management subsystem 140 may be configured to obtain data (e.g., test results and/or status data) from the network devices. Such data may be provided to the test management subsystem 110, which may make the data, or a subset of the data, available to the access device 120 for consideration by a user. The data may include test results, notifications, network status information, and any information related to testing network resources that may be helpful to the user of the access device 120.

In the above-described manner, the test management subsystem 110 and the network management subsystem 140 may function to provide an interface between the access device 120 of an external party and the network devices of the communication network 160. This enables the external party to remotely control and manage operations for testing network resources maintained by an internal party.

Examples of test management operations that may be requested by an external party utilizing the user portal provided by the test management subsystem 110 include, but are not limited to, creating trouble tickets, viewing trouble ticket information, filtering or sorting trouble tickets, modifying or canceling trouble tickets, initiating, scheduling, modifying, and canceling tests of network resources (e.g., intrusive and/or non-intrusive circuit tests), viewing results of network testing, viewing the status of network testing operations and orders, requesting notification of testing completion, receiving notification of test completion and/or results, searching for service identifiers (e.g., a circuit identifier), generating reports, customizing output information such as a trouble ticket summary table, selecting and testing an entire circuit, and selecting and testing a subsection of a circuit, including placing a loop at a network device to designate a circuit subsection to be tested.

Figure 2:
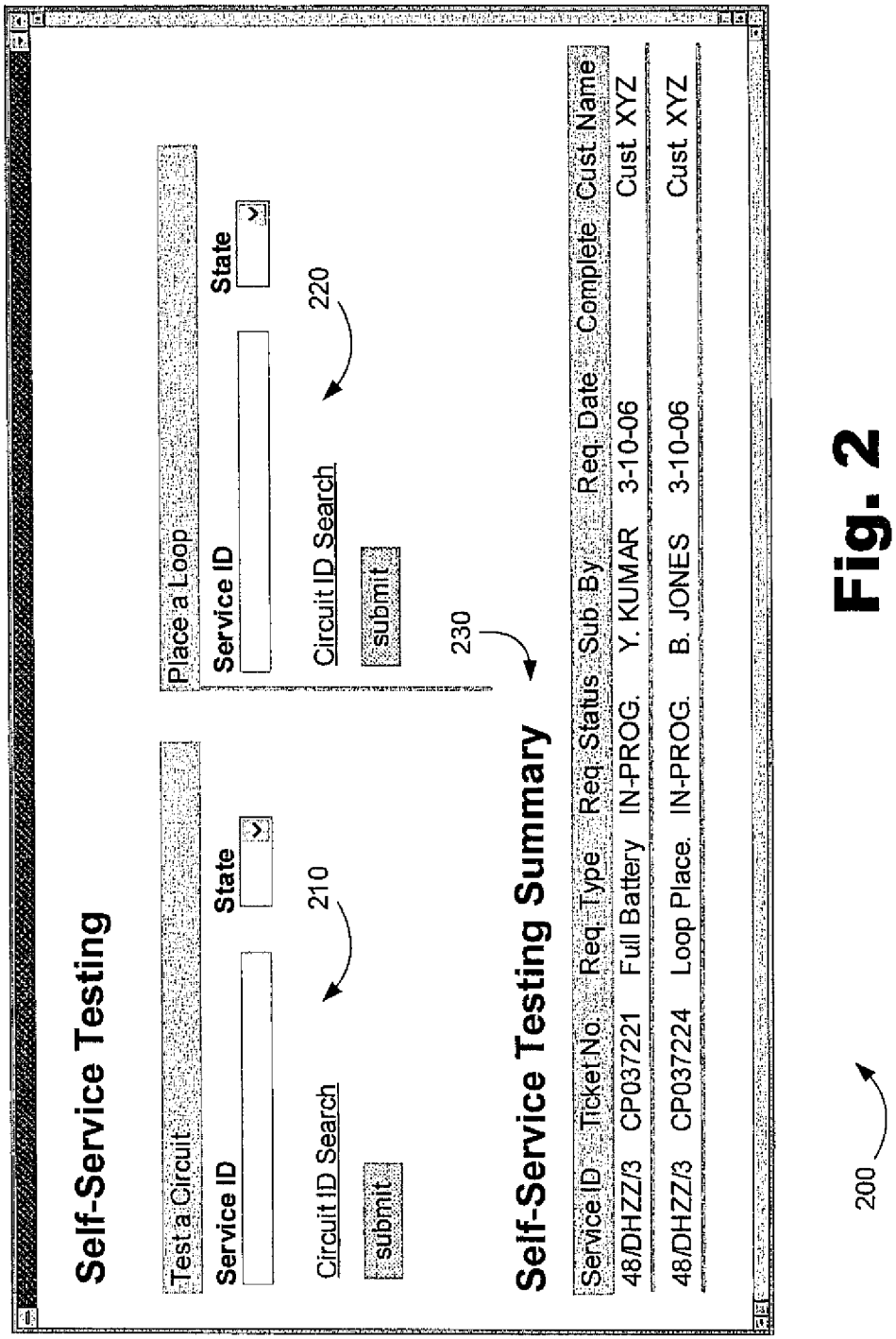
FIG. 2 illustrates an exemplary graphical user interface that may be provided by the self-service circuit testing system of FIG. 1.
Figure 3B:
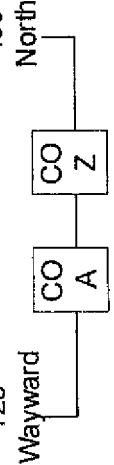
FIG. 3B illustrates yet another exemplary graphical user interface that may be provided by the self-service circuit testing system of FIG. 1.

To facilitate an understanding of exemplary user portal tools enabling an external party to test network resources via the test management subsystem 110 and the network management subsystem 140, FIGS. 2-3B illustrate examples of user portal graphical user interfaces ("GUIs") that may be provided by the test management subsystem 110 and presented to the external party via the user interface 130. In FIG. 2, an exemplary GUI 200 presents self-service testing tools, including a tool 210 for initiating a test of an entire circuit and a tool 220 for placing a loop to identify a signal loop for testing a circuit or a subsection of the circuit. The GUI 200 may also include additional information and/or tools, including a summary 230 and/or other information descriptive of self-service testing requests, operations, and results.

Each tool 210 and 220 enables a user to provide input for identifying a particular circuit. In FIG. 2, the identifier is labeled "Service ID." A user may provide a service ID in a service ID field and select a corresponding geographical area such as a "State." If the user does not know the entire Service ID, a "Circuit ID Search" link may be selected to launch a window and/or tool for searching for a Service ID.

Once input identifying a circuit is entered in the appropriate fields, the user may submit the information to the test management subsystem 110, which may use the information to identify the corresponding circuit. As described above, the test management subsystem 110 may store information descriptive of the communication network 160, including network resource identifiers (e.g., service IDs). Alternatively, such information may be stored by network management subsystem 140, and the test management subsystem 110 may communicate the circuit identifier to the network management subsystem 140, which can return information associated with the circuit identifier to the test management subsystem 110.

If the user utilizes tool 210 to submit a circuit identifier, the test management subsystem 110 may provide the access device 120 with another GUI, such as GUI 300 shown in FIG. 3A. The GUI 300 may include tools for collecting additional input related to testing the entire circuit corresponding to the circuit identifier.

As shown in FIG. 3A, GUI 300 may display the circuit identification information (e.g., Service ID and State), thereby showing that the circuit corresponding to the Service ID has been identified by the test management subsystem 110. A tool such as a drop down menu 310 may be provided such that an external party is able to select a type of test to be conducted. When GUI 300 is presented in response to a user selecting to test a circuit, a "full test battery" may be a default test selection in drop down menu 310, and the user can utilize the drop down menu 310 to change the type of test operation to be performed.

A change to the selected test operation may cause the contents of GUI 300 to change as well. For example, if the selected test is changed from "Full Test Battery" to "Loop Placement," the GUI 300 may be modified to include information and options associated with placing a loop. An example of such a GUI is shown in FIG. 3B and will be described further below. Examples of test operations that may be listed for selection in drop down menu 310 include, but are not limited to, full test battery, circuit test, loop placement, and circuit analysis.

With a "Full Test Battery" test operation (or other full circuit test operation) selected, the external party may utilize GUI 300 to provide additional information related to the test and to submit the information to the test management subsystem 110. As shown in FIG. 3, the GUI 300 may include a tool 315 through which the external party is asked to acknowledge an understanding of the ramifications of running the selected test operation, including acknowledging an understanding that a full test battery request is an intrusive request that interrupts service, for example.

The GUI 300 may also include a tool 320 enabling the external party to schedule a circuit test operation. In some examples, a user may be able to select between running a circuit test operation immediately and scheduling the circuit test operation to begin at a later date and/or time. Tool 320 can be used by the external party to indicate specific time parameters descriptive of when the circuit test operation should be executed.

The GUI 300 may also include a tool 330 enabling the external party to request to be notified when results of the circuit test operation become available. In some examples, a user may be able to select a particular type of communication (e.g., e-mail) to be used to provide notification, as well as to provide an address to which a notification should be provided (e.g., an e-mail address). In some cases, the notification may include data representative of test operation statuses and/or results.

The GUI 300 may also include a tool 335 enabling the external party to identify who requested the circuit test operation. In some examples, a user requesting the circuit test operation may be able to provide identification information such as a name, contact method (e.g., telephone), and contact number (e.g., telephone number).

As shown in FIG. 3A, the GUI 300 may also include a description 340 of the selected circuit test operation. The description may provide any potentially helpful information to the external party, including an explanation of how a circuit test (e.g., a full test battery) will function. In FIG. 3A, the description explains that a full test battery runs all stress test patterns to insure that a circuit is operating in accordance with technical service specifications. The description may also include a hyperlink 345 to additional information about the circuit test. The description may also include information about the duration of the circuit test. In the example shown in FIG. 3A, the duration of the selected full test battery is a minimum of one-hundred-twenty (120) minutes.

Once the appropriate information has been entered in the GUI 300, the external party may submit the information to the test management subsystem 110, which may receive and process the test request data as described above to provide messages to the network management subsystem 140, which can instruct appropriate network devices to perform the requested test operations, as described above.

The network devices may execute the requested circuit test operations and provide test operation and results data to the network management subsystem 140, which can provide the test data to the test management subsystem 110, as described above. The test management subsystem 110 can store the test data in the data store 184 and/or provide notification to the user in accordance with the notification information provided by the user. For example, a summary of test data may be provided to the access device 120 for presentation in the user interface 130.

If the test data indicates that the tested circuit is performing in accordance with predefined technical service specifications, the external party may be satisfied with the performance of the circuit and may elect not to initiate other tests. On the other hand, if the test results data shows a problem with the tested circuit, the test management subsystem 110 may provide the external party with additional information and/or tools for additional testing, including testing of specific signal loops along the circuit. The test management subsystem 110 may provide the user with information descriptive of the problems and/or suggestions as to how the user may wish to proceed. Suggestions may be based on results of other network tests that have been performed on network resources that may have some relation to the circuit of interest. For example, the test management subsystem 110 may be configured to store test results received from the network management subsystem 140 in the data store 184. This information may be accessed by the test management subsystem 110 and used to generate suggested testing steps for the user. This enables the user to leverage the tests of other users to efficiently identify problems and/or solutions to the problems while avoiding the performance of unnecessary or unhelpful tests.

By way of example, if a circuit test revealed a problem with a circuit connecting an endpoint in Los Angeles, Calif. with an endpoint in Boston, Mass., the test management subsystem 110 may query a data store (e.g., data store 184) storing past test results for any data that may be descriptive of tests performed on network resources (e.g., other circuits) having some relation to the circuit of interest. For instance, past tests of other circuits connecting one or more endpoints located in or proximate to the same geographic areas of the endpoints of the circuit being tested may provide helpful information.

In particular, patterns exhibited by past tests may prove helpful. For example, if past test results show a noticeable number of problems with circuits having endpoints in Boston, Mass. as compared to circuits having endpoints in Los Angeles, Calif., the test management subsystem 110 may recommend that additional testing focus on circuit subsections closer to Boston, Mass. than to Los Angeles, Calif. This is just one example of a heuristic that may be employed by the test management subsystem 110 to generate a recommendation based on past test results. The heuristic may generally make a recommendation based on likelihoods or probabilities that can be identified from past test results of related network resources. Other suitable heuristics may be used to determine where a problem is likely to be found based on past test data for related network resources.

In certain embodiments, the test management subsystem 110 enables the user to select from different signal loops to be used to test the circuit or subsections of the circuit. Accordingly, the user is able to identify circuit subsections to be tested. If the user portal provides a recommendation to test a particular subsection of the circuit, the user may follow the recommendation and request a signal loop be placed for testing the recommended subsection of the circuit. If the problem is identified within the subsection during a test of the subsection, the recommendation from the test management subsystem 110 may have saved the user valuable time and minimized the amount of time that network resources were not usable due to intrusive testing.

FIG. 3B illustrates an example of another GUI 350 that may be presented to a user associated with an external party. GUI 350 may enable the user to initiate a loop placement test operation. The test management subsystem 110 may present GUI 350 in response to any predetermined event, including, but not limited to, a full circuit test identifying a problem with the tested circuit as described above, the user selecting a loop placement option using tool 310 of FIG. 3A, and the user using tool 220 of FIG. 2 to select a loop placement request and circuit identifier.

As shown in FIG. 3B, GUI 350 may include tools 310, 315, 320, 330, and 335, which may function in the same or similar manner as described above in relation to FIG. 3A, only with respect to a loop placement operation rather than a full circuit test operation. For tool 310, for example, the default selection may be the "loop placement" option. The GUI 350 may include a description 340 of the selected test operation, which in the example shown in FIG. 3B describes a loop placement operation.

In addition, GUI 350 may include other tools such as tool 355 enabling the user to select a duration for a loop placement test operation or configuration, the duration identifying a length of time that the loop placement test operation, mode, or configuration will be executed. In some examples, a user may be able to select a duration that falls within a predetermined range (e.g., a range between a minimum and maximum duration such as 10-120 minutes).

As shown in FIG. 3B, the GUI 350 may also include a tool 360 enabling the external party to select a signal loop. Selection of a signal loop determines a path that test signals will follow during a test. Selection of a signal loop may also be used to choose which section of an identified circuit will be tested. With tool 360, a user is able to select to test an entire circuit or to test a subsection of the circuit. As shown in FIG. 3B, tool 360 may include a plurality of selectable options enabling an external party to select between different signal loop testing configurations. In the example of FIG. 3B, each signal loop includes a beginning point and a loop-back point. In each option, the beginning point includes one of the endpoints of the circuit. The loop-back point for each option may include the other endpoint of the circuit for testing the entire circuit or an intermediary point along the circuit (i.e., between the two endpoints of the circuit) for testing a subsection of the circuit. Accordingly, the external party can choose from the different options to identify the signal loop to be used to test a selected section of the circuit.

In the example shown in FIG. 3B, the selected circuit has endpoints located at 123 Wayward and 456 North and intermediary points located at Central Office A and Central Office Z. The selectable options available to the external party in FIG. 3B include selecting a circuit subsection signal loop beginning at 123 Wayward and looping back at Central Office A ("Option 1"), an entire circuit signal loop beginning at 123 Wayward and looping back at 456 N ("Option 2"), another circuit subsection signal loop beginning at 456 N and looping back at Central Office Z ("Option 3"), and another entire circuit signal loop beginning at 456 North and looping back at 123 Wayward ("Option 4"). These options are illustrative and not in any sense restrictive. Other options may be provided in other embodiments. For example, other options may include a circuit subsection signal loop beginning at 123 Wayward and looping back at Central Office Z and a circuit subsection signal loop beginning at 456 North and looping back at Central Office A, for example.

Thus, in certain embodiments, the tool 360 enables the external party to select a circuit subsection from a plurality of circuit subsections included in a circuit. In FIG. 3B, the signal loop options depict two different options for testing the entire circuit (i.e., endpoint to endpoint) and two different options for testing different subsections of the circuit. In this example, "Option 1" depicts a first circuit subsection (i.e., between points at 123 Wayward and Central Office A) and "Option 3" depicts a second circuit subsection (i.e., between points at 456 North and Central Office Z). Accordingly, the external party can select one of the subsections for testing.

Selectable signal loop options may be presented in different ways in other embodiments. For example, instead of enabling the external party to select a predefined signal loop option, the tool 360 may enable the user to individually select from selectable beginning points and selectable loop-back points to define a signal loop. Thus, in some examples, the user can utilize tool 360 to select a loop-back location from a plurality of loop-back locations along the circuit.

The test management subsystem 110 may be configured to populate tool 360 with selectable options that are defined based on the circuit identifier provided by the external party and network data related to the corresponding circuit. As described above, network data descriptive of or otherwise associated with the circuit (and other network circuits) may be maintained by the test management subsystem 110. The test management subsystem 110 may use this data to determine the options that will be included in tool 360. Accordingly, the selectable options made available to the user may be selected based on the capabilities of devices located along an identified circuit. For example, loop-back points may include any network devices along the circuit that are capable of operating in remote loop-back mode. That is, the selectable options may be based on the capabilities of network devices to be remotely put and operate in remote loop-back mode.

As shown in FIG. 3B, GUI 350 may also include a visual representation 370 of the identified circuit and the corresponding signal loop options included in tool 360. In FIG. 3B, the signal loop options are visually represented by direction arrows next to the corresponding signal loop option identifiers (e.g., "Option 1").

Information for generating the visual representation 370 may be included in the network data related to the identified circuit and maintained by the test management subsystem 110. The data may be updated in any suitable manner to reflect the current configuration and status of network resources. For example, the data may be updated based on update messages received from the network management subsystem 140. Thus, when a user selects a circuit and a loop placement operation, the test management subsystem 110 may access network data related to the circuit, identify signal loop options based on the data, and provide the signal loop options to the access device 120 for presentation in GUI 350.

As described above, in some situations, the test management subsystem 110 may provide a recommendation as to how the user ought to proceed. Such a recommendation may include suggesting one of the signal loop options included in the GUI 350. For example, the GUI 350 may indicate a recommended signal loop option to the user, such as by highlighting the visual representation 370 of a particular signal loop option, or automatically marking the selection box associated with the recommended signal loop option. The GUI 350 may include any suitable way of indicating the recommendation, including a textual description of the recommendation.

In other embodiments, non-recommended signal loop options may be redacted from the GUI 350. For example, if a full circuit test has been conducted, a signal loop defining the same or similar test pattern signal flow may be redacted to help avoid redundant testing.

When the external party selects one of the available signal loop options, visual representation 370 may be updated to highlight or otherwise visually indicate the selected signal loop. For example, all of the options may be displayed using a particular shade and brightness, and the selected signal option may be displayed using a contrasting shade and/or brightness that enables a user to visually distinguish the selected option from the other visually represented options. The description 340 and/or visual representation 370 may help an external party to quickly understand a loop placement selection and test operation.

When the external party selects one of the available signal loop options, the test management subsystem 110 and the network management subsystem 140 may function similar to the description above to configure the communication network 160 for the selected signal loop. More specifically, the test management subsystem 110 may use test request data and stored network data to generate a workflow event designed to put network device(s) associated with the selected signal loop into loop-back mode. At the appropriate time, the test management subsystem 110 may execute the workflow event, which may include generating and providing one or more signals to the network management subsystem 140. The network management subsystem 140 may receive the signal(s) and instruct one or more network devices to operate in accordance with the instructions included in the signal(s). For example, the network management subsystem 140 may put a network device (e.g., intermediary network device 164) in a loop-back mode. At the expiration of the loop-back duration, the test management subsystem 110 and the network management subsystem 140 may again work together to instruct the network device to end the loop-back mode (i.e., return to normal pass-through mode for traffic on the identified circuit). Communications between the test management subsystem 110, the network management subsystem 140, and network devices of the communication network 160 may be performed using any of the communication technologies described above.

At any time during this process, the network device in loop-back mode and/or other devices of the communication network may provide status data to the network management subsystem 140. The network management subsystem 140 may provide the status data to the test management subsystem 110, which may store and/or make at least a subset of the status data available to the user via the access device 120.

By way of a specific example of a loop placement request, the user may select signal loop "Option 1" from GUI 350. The test management subsystem 110 may receive data representative of the request and query the data store 184 to identify the network device(s) associated with the request. For example, an endpoint device associated with the 123 Wayward location and an intermediary network device associated with Central Office A may be identified. The workflow engine 186 may generate one or more workflow events, the performance of which will generate messages to be sent to the network management subsystem 140. In particular, the test management subsystem 110 may provide a signal instructing the network management subsystem 140 to cause the identified intermediary network device to execute a loop-back mode for the identified circuit to form the selected signal loop along a subsection of the circuit.

With the network device in loop-back mode, the external party is able to initiate tests of a subsection of the circuit. An endpoint device associated with the external party may transmit test pattern signals. The network device in loop-back mode will reflect the test pattern signals back to the endpoint device, which can receive the reflected test pattern signals. The received signals can be used to analyze the performance of the tested circuit subsection.

Test results may be received by the external party directly from an endpoint device transmitting the test signals and/or indirectly through the user portal provided by the test management subsystem 110. The network management subsystem 140 may collect test data from one of more devices of the communication network 160 and provide the data to the test management subsystem 110, which can then make the test data available to the external party through the user portal. Other types of data may be similarly provided to the external party, including network status and configuration data.

Figure 4:
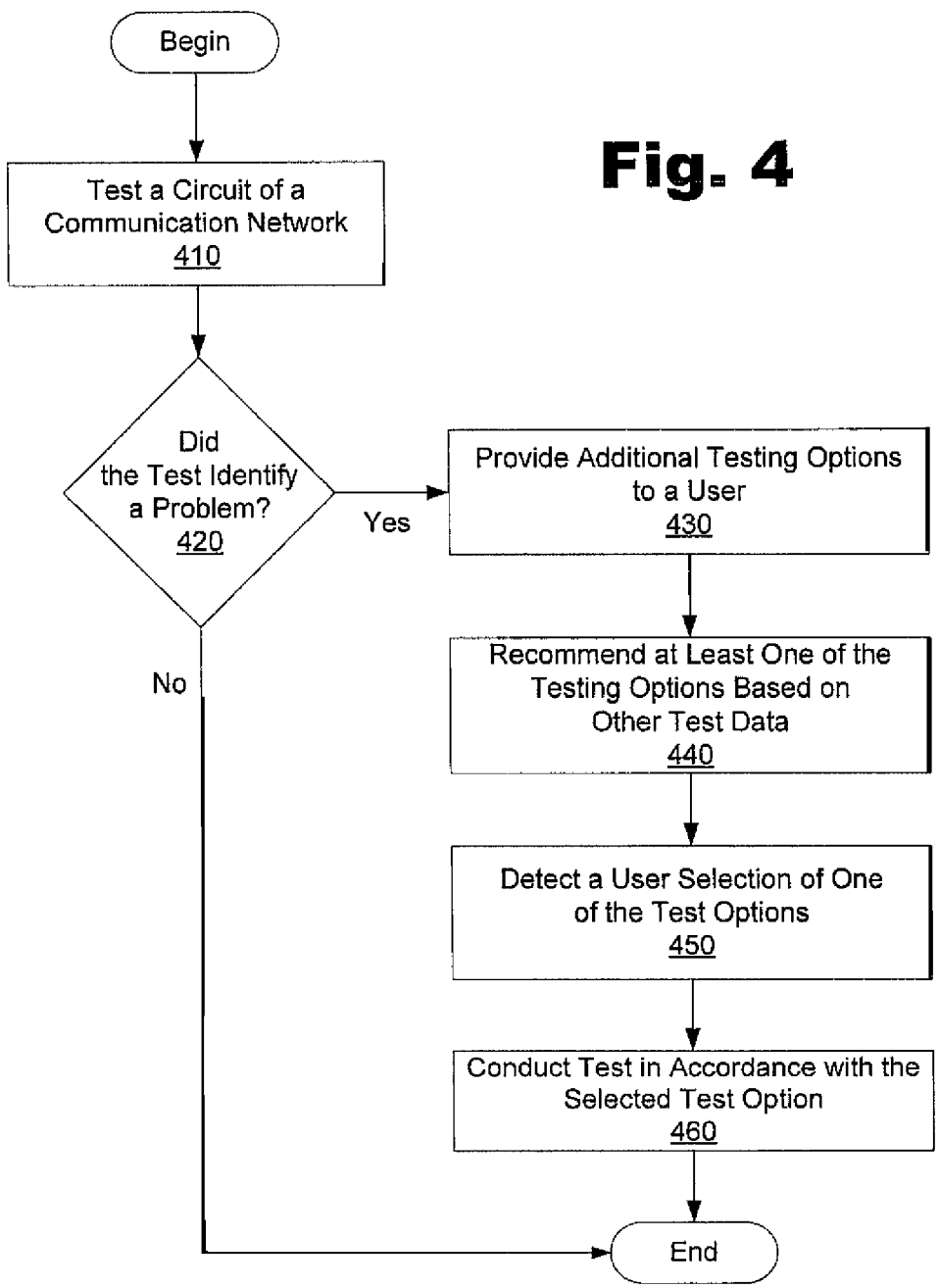
FIG. 4 is a flowchart illustrating an exemplary self-service circuit testing process.

FIG. 4 is a flowchart illustrating an exemplary self-service circuit testing process. While FIG. 4 illustrates exemplary steps according to one embodiment, other embodiments may omit, add to, reorder, and/or modify any of the steps shown in FIG. 4.

In step 410, a circuit of a communication network is tested. Step 410 may be performed in any of the ways described above, including an external party utilizing a user portal provided by the test management subsystem 110 to initiate the test, and the test management subsystem 110 and network management subsystem 140 functioning as described above to control network devices in the communication network 160 such that a circuit in the communication network 160 is tested.

In step 420, it is determined whether the circuit test identified a problem. Step 420 may be performed in any of the ways described above, including the test management subsystem 110 obtaining test data by way of the network management subsystem 140 and determining whether the test data is indicative of a problem associated with the circuit. If no problem is found, the method of FIG. 4 may end.

If a problem is identified in step 420, processing may continue as step 430. In step 430, additional testing options are provided to a user. Step 430 may be performed in any of the ways described above, including the test management subsystem 110 providing the additional test options in a GUI presented to an external party via an access device 120. The additional test options may include signal loop options defining different signal loops for testing various sections of the circuit. The additional test options provide the user with an additional level of options for testing network resources, and can help the user pinpoint problems.

In step 440, at least one of the testing options may be recommended based on other test data. Step 440 may be performed in any of the ways described above, including the test management subsystem 110 recommending one of the signal loops based on test data that has been obtained from tests of other network resources. The test management subsystem 110 may include a heuristic configured to identify related test data and identify a test option that is likely to produce results that our helpful to the user. The recommendation can leverage the test data of others to save potentially save the user time and costs associated with circuit down time.

In step 450, a user selection of one of the test options is detected. The selected test option may identify a signal loop along the circuit. The signal loop may traverse the entire circuit or subsection of the circuit. Accordingly, the user can elect to test only a circuit subsection, which can help pinpoint a problem and/or leave other sections of the circuit available for normal operations.

In step 460, a test is conducted in accordance with the selected test option. This may be a test of the selected signal loop along the circuit.

Figure 5:
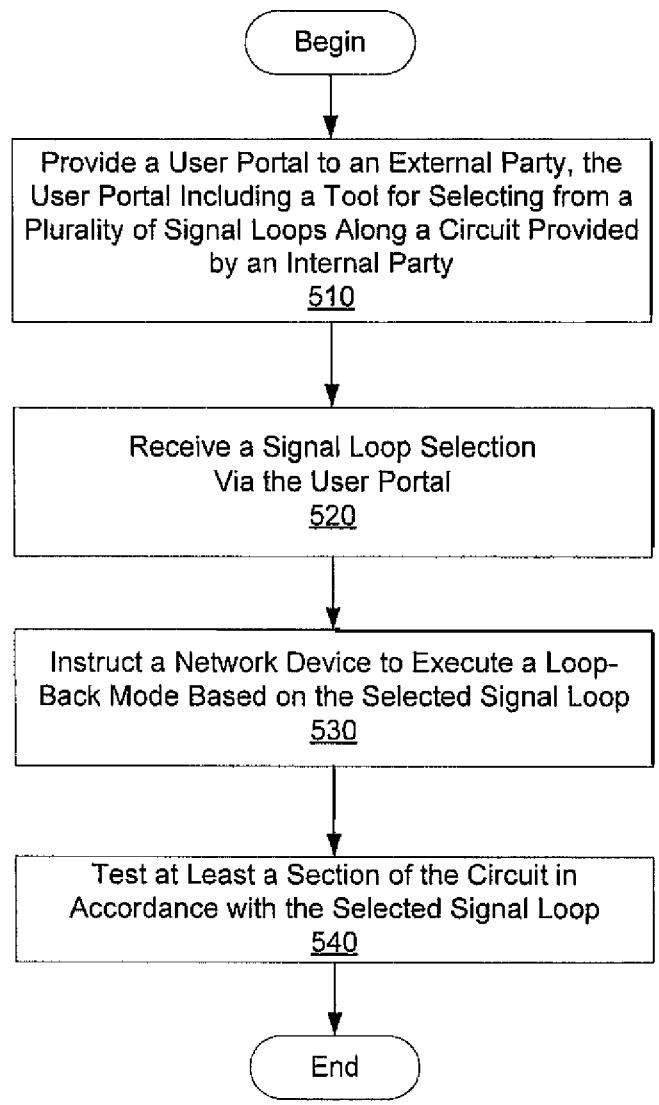
FIG. 5 is a flowchart illustrating another exemplary self-service circuit testing process.

FIG. 5 is a flowchart illustrating another exemplary self-service circuit testing process. While FIG. 5 illustrates exemplary steps according to one embodiment, other embodiments may omit, add to, reorder, and/or modify any of the steps shown in FIG. 5.

In step 510, a user portal is provided to an external party, the user portal including a tool enabling an external party to select from a plurality of signal loops along a circuit provided by an internal party. Step 510 may be performed in any of the ways described above, including the test management subsystem 110 providing a user portal to access device 120 for presentation to the external party in user interface 130. The signal loops may be traverse the entire circuit or various subsections of the circuit. Thus, the external party can select a signal loop to identify a subsection of the circuit to be tested.

In step 520, a selection of one of the signal loop options is received from the external party via the user portal. Step 520 may be performed in any of the ways described above, including the test management subsystem 110 receiving the selection from access device 120.

In step 530, a network device is instructed, based on the selected signal loop, to execute a loop-back mode. Step 530 may be performed in any of the ways described above, including the test management subsystem 110 communicating data representative of the selection to the network management subsystem 140, which then instructs the network device to execute the loop-back mode.

In step 540, a test of at least a section of the circuit is performed in accordance with the selected signal loop. Step 540 may be performed in any of the ways described above, including the external party using an endpoint device to transmit test pattern signals over a section of the circuit, the network device reflecting the test pattern signals, and the endpoint device receiving the reflected test pattern signals.

The tools described above provide a user associated with an external party with robust options for testing a circuit, or subsections of the circuit. The tools grant an increased level of control to the external party, as compared to conventional testing application. In particular, by being able to choose from different signal loops that can cover all or part of a circuit, the external party is able to customize testing operations in a manner that can quickly identify problems.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A system comprising:
a test management subsystem configured to provide a user portal to a user of a circuit provided by a service provider, said user portal including a tool enabling the user to select a signal loop for testing at least a section of the circuit, the signal loop being selected from a plurality of signal loop options, wherein the test management subsystem is configured to receive one or more schedule parameters; and
a network management subsystem communicatively coupled to said test management subsystem, said network management subsystem configured to receive data representative of the selection from said test management subsystem and instruct, based on the selection and the one or more schedule parameters, a network device at an intermediary point of the circuit to execute a loop-back mode.

2. The system of claim 1, wherein the selected signal loop defines a test pattern signal flow for testing a subsection of the circuit.

3. The system of claim 2, wherein the subsection includes as its endpoints an endpoint and the intermediary point of the circuit.

4. The system of claim 3, wherein the network device is operated by the service provider.

5. The system of claim 4, wherein the endpoint of the circuit includes an endpoint device associated with the user.

6. The system of claim 5, wherein the endpoint device is configured to send and receive test signals over the subsection, the network device configured to receive and loop the test signals back to the endpoint device.

7. The system of claim 1, wherein at least a subset of the plurality of signal loop options defines a plurality of signal flows for testing different subsections of the circuit.

8. The system of claim 1, wherein said user portal includes a visual representation of the circuit and the plurality of signal loop options associated with the circuit.

9. The system of claim 1, wherein said test management subsystem provides the service provider access to the user portal by way of a remotely located access device communicatively coupled to said test management subsystem.

10. The system of claim 1 wherein said test management subsystem is configured to store test results data and recommend one of the signal loop options to the service provider via the user portal, the recommendation being based on at least a subset of the stored test results.

11. A system comprising:
a test management subsystem communicatively coupled to a remotely located access device associated with an external party, said test management subsystem being configured to provide a user portal to the access device, said user portal including a tool enabling the external party to select from a plurality of selectable signal loops along a communication circuit provided by an internal party, wherein at least one of the selectable signal loops defines a test pattern signal flow for testing a subsection of the communication circuit, wherein the test management subsystem is configured to receive one or more schedule parameters; and
a network management subsystem communicatively coupled to said test management subsystem, said network management subsystem configured to receive data representative of a selection of one of the signal loops from said test management subsystem and instruct, based on the selection and the one or more schedule parameters, a network device at an intermediary point along the circuit to execute a loop-back mode.

12. A method comprising:
providing a user portal including a tool enabling a user to select for testing at least one communication circuit;
receiving a test request from the user via the user portal;
conducting a test of the communication circuit, the test identifying at least one problem associated with the communication circuit;
providing additional testing options to the user via the user portal, the additional testing options including the plurality of selectable signal loops defining the plurality of test pattern signal flows;
detecting a user selection of one of the selectable signal loops;
receiving one or more schedule parameters; and
instructing, based on the selection and the one or more schedule parameters, a network device located at an intermediary point along the communication circuit to execute a loop-back mode.

13. The method of claim 12, further comprising conducting a test in accordance with the selected signal loop.

14. The method of claim 13, said conducting including: sending a test pattern signal from an endpoint of the communication circuit; and reflecting the test pattern signal back to the endpoint, said reflecting being performed at the network device.

15. The method of claim 14, wherein the selected signal loop is configured for testing a subsection of the communication circuit.

16. The method of claim 13, further comprising providing data representative of a test result to the user via the user portal.

17. The method of claim 12, wherein the user is associated with an external party and the communication circuit is provided by an internal party, and wherein said providing includes providing the user portal to a remotely located access device associated with the external party.

18. The method of claim 12, further comprising:
identifying one of the signal loops to recommend based on stored test data; and
providing a recommendation of the identified signal loop to the user via the user portal.

* * * * *